March 17, 1964 R. W. FITZ MAURICE 3,125,112
SEQUENCE IRRIGATION VALVE
Filed Sept. 12, 1962 2 Sheets-Sheet 1
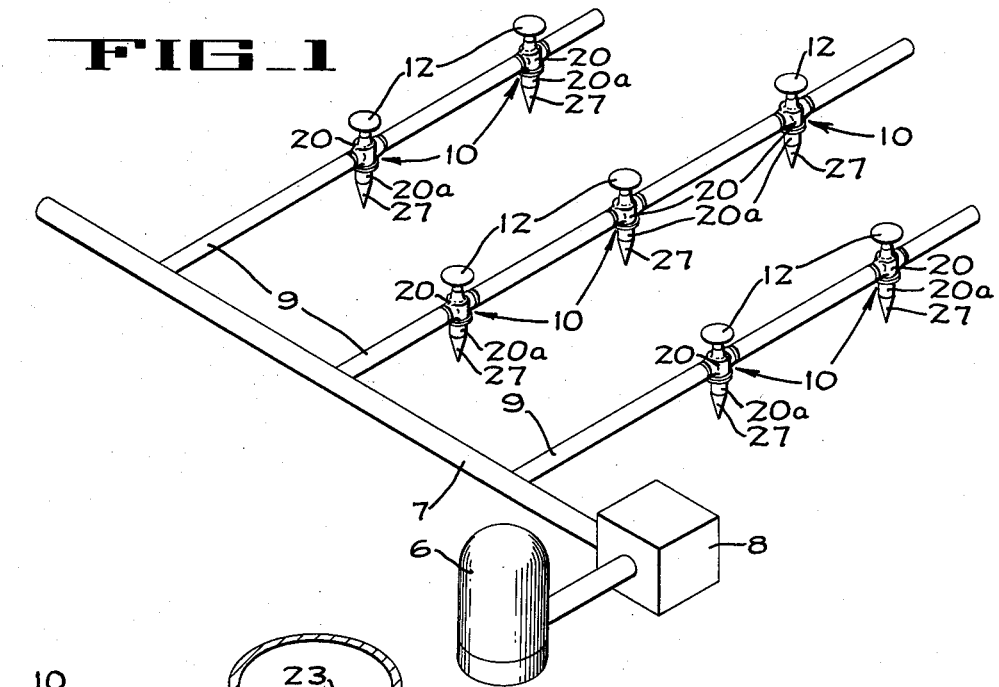
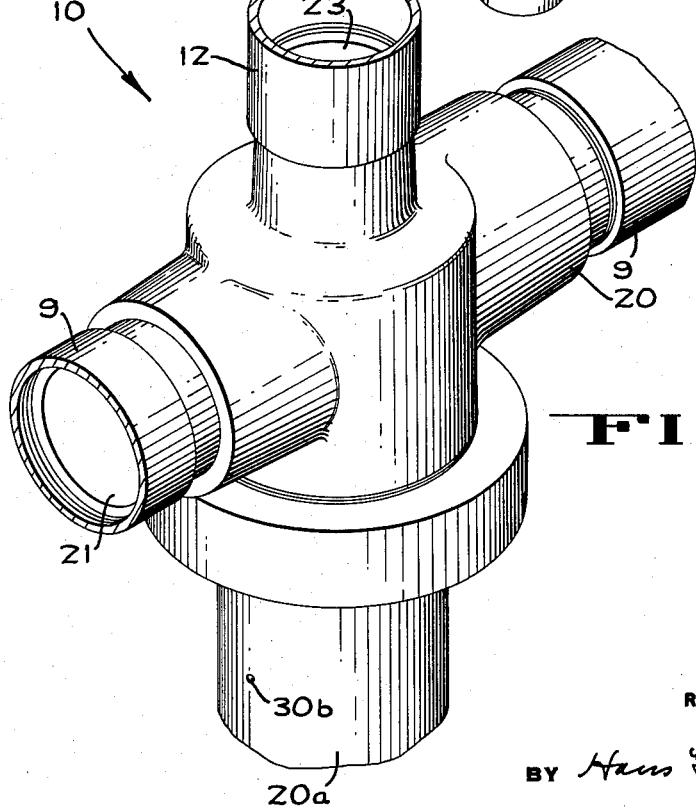
INVENTOR
RICHARD W. FITZ MAURICE
BY Hans G. Hoffmeister
ATTORNEY

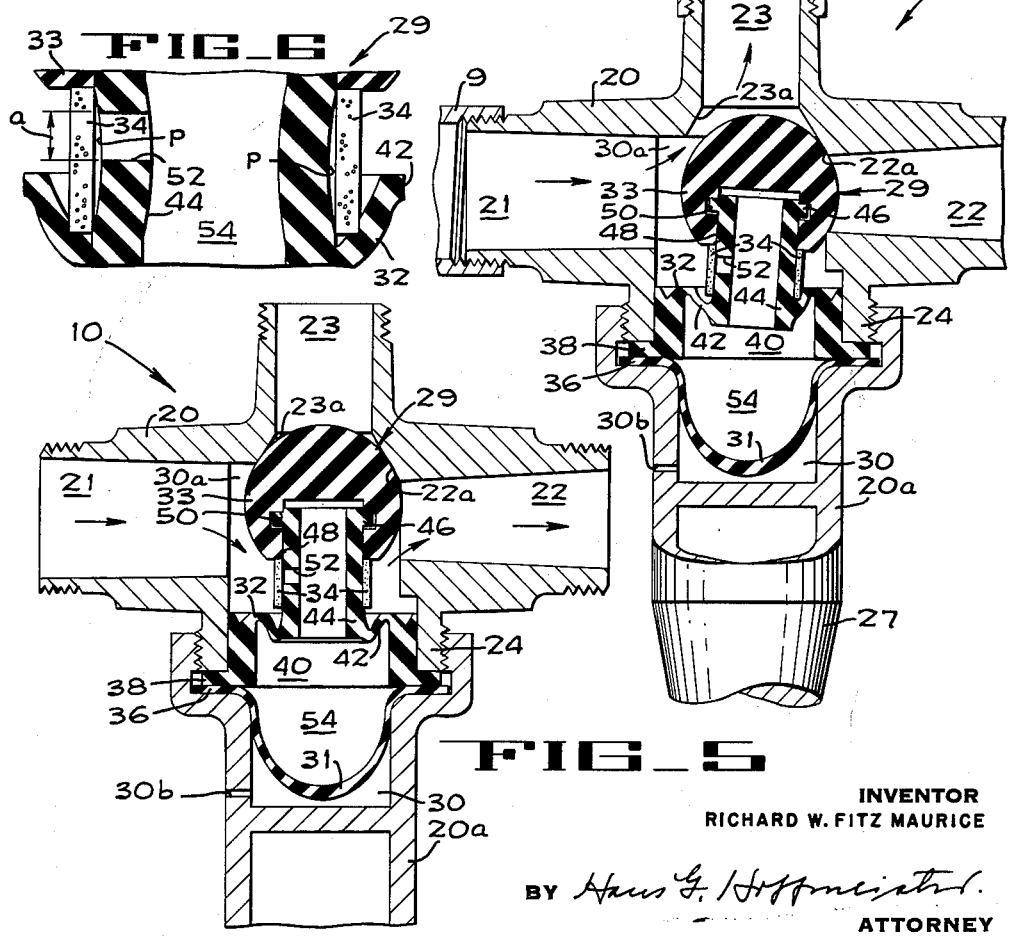

United States Patent Office 3,125,112
Patented Mar. 17, 1964

3,125,112
SEQUENCE IRRIGATION VALVE
Richard W. Fitz Maurice, Santa Clara, Calif., assignor to FMC Corporation, San Jose, Calif., a corporation of Delaware
Filed Sept. 12, 1962, Ser. No. 223,051
7 Claims. (Cl. 137—119)

The present invention appertains to valves; and more particularly relates to sequence irrigation valves of the type operable in response to timed changes of pressure of the irrigation water being distributed by the valves.

One object of the present invention is to provide an improved sequence irrigation valve.

Another object is to provide a sequence valve suitable for a portable irrigation system.

Another object is to provide an improved sequence irrigation valve which is operated by establishing timed pressure differences between the pressure of the water in the valve body and the pressure of water in a control chamber within the valve.

Another object is to provide a sequence irrigation valve that employs the irrigation water flowing through the valve as a valve controlling agent, without permitting foreign matter in the water to interfere with valve operation.

A further object is to provide a combined metering element and filter in a water actuated sequence irrigation valve that will not become clogged with dirt, or the like, present in the irrigation water, the metering portion of the element being self-cleaning.

Another object is to provide a sequence irrigation valve which is easily disassembled in the field for servicing, cleaning, or replacement of the valve member and its actuating elements.

These and other objects and advantages of the present invention will become apparent from the following description and the drawings, in which:

FIG. 1 is a diagram of a sequential irrigation system which employs several of the sequence valves of the present invention.

FIG. 2 is a perspective of one of the sequence irrigation valves of FIG. 1.

FIG. 3 is a central vertical section of the sequence valve showing the valve element in its initial or neutral position.

FIG. 4 is a central vertical section of the sequence valve showing the valve element in position to open the port leading to the sprinkler head.

FIG. 5 is a central vertical section of the sequence valve showing the valve element in position to close the sprinkler port and transfer water to the next sequence valve.

FIG. 6 is an enlarged fragmentary section illustrating the filtering action of the combined metering and filtering element.

An irrigation system fitted with valves of the present invention is diagrammatically shown in FIGURE 1. A pump 6 supplies water to an automatic pressure controller 8 of any suitable type such, for example, as an automatically timed water pressure control valve. A suitable valve timer is disclosed in the pending application of Fowler, Ser. No. 859,313, filed December 14, 1959, and assigned to the assignee of the present application. The controller is connected to a main line 7, from which extends a plurality of lateral pipe lines 9. A plurality of sequence valves 10 of the present invention are mounted in each lateral line 9, and each valve mounts a sprinkler 12. In operation, water entering the foremost valves 10 in the lateral lines 9 flows out of associated sprinkler heads 12. No water reaches the downstream sequence valves. After a predetermined sprinkling interval has elapsed, the pressure controller 8 reduces the water pressure in line 7, and hence in lateral lines 9. This reduction in pressure will be momentary, in the order of several seconds. As will be seen, this momentary reduction of pressure results in positioning a valve member ready for closing off the sprinkler port of each foremost sequence valve 10, and an outlet port in each of these valves 10 is simultaneously opened. When the controller 8 re-establishes full water pressure, the water now flows straight through the sequence valves that have just completed their sprinkling cycle, and enters the next downstream valve 10 in each lateral line 9. The water now flows out of the sprinkler heads 12 associated with each of the latter valves 10.

The next reduction and resumption of pressure by the controller 8 repeats the action just described, and the third sequence valve in each lateral line will begin its sprinkling cycle. This action is repeated until all of the sequence valves 10 in each lateral line 9 have completed a sprinkling cycle. The pressure controller 8 then reduces the water pressure in supply line for a relatively long period of time. During this period, all the sequence valves 10 return to their original or neutral positions, so that the next resumption of water pressure will initiate a second irrigation cycle.

Since all of the sequence valves 10 are identical, the description of one will suffice for all. The sequence valve 10 of the present invention has a composite body formed of a cross-shaped main body portion 20 (FIG. 2) and having a base portion 20a. The main body portion is provided with an inlet port 21 and an outlet port 22, both of these ports being connected into the lateral line 9. Outlet port 22 has an internal valve seat 22a. Each valve is also formed with a second outlet or sprinkler port 23 connected to the associated sprinkler head 12. Sprinkler port 23 has a sprinkler valve seat 23a. The lower portion 24 of the main valve body portion 20 is threaded to the valve supporting base portion 20a. As shown in FIGS. 1 and 4, the base portion 20a mounts a spike 27, that is forced into the ground to hold the associated valve 10 in an upright position.

A valve assembly, indicated generally at 29 (FIGS. 3, 4 and 5), is disposed within the valve body and divides the interior of the valve into a water isolated chamber 30 in the base portion of the valve body, and a water receiving chamber 30a in the main body portion 20. The chamber 30 is vented to the atmosphere by means of a small vent port 30b, formed in the base portion 20a. The valve assembly 29 comprises an actuator having a reservoir diaphragm 31, a control chamber diaphragm member 32, a valve ball 33 carried by the control chamber diaphragm member 32, and a combined filtering and metering sleeve 34. The diaphragm 31, the ball 33, and the ball supporting diaphragm member 32 are formed of a flexible, resilient material such as natural or synthetic rubber. The reservoir diaphragm 31 has a peripheral flange 36 that is clamped against a peripheral flange 38 on the control chamber diaphragm, by the threaded mounting of the base portion 20a on the main body portion 20. The control chamber diaphragm member has a tubular portion 40 that extends upwardly from its flange 38 and fits within the lower body portion 24. A flexible skirt 42 connects tubular portion 40 with a tubular stem 44, and the stem 44 has a ball mounting flange 46 at its upper end. The valve ball 33 has a cylindrical socket 48 for snug engagement with stem 44, and the ball is formed with an undercut groove 50 adjacent the upper end of the socket. The groove 50 in the ball receives the flange 46 on the stem 44.

The combined filter and metering element 34 surrounds stem 44 and is formed of a foraminous material, namely sintered bronze. The stem 44 is formed with a port 52 that establishes a flow passage between the external chamber 30a and an interior control chamber 54 that is defined by the reservoir diaphragm 31, the control diaphragm member 32, and the ball 33. The action of the combined metering and filtering element will be explained in detail after the description of the operation that follows:

In operation, the controller 8 is operated to supply water under pressure through the inlet port 21. As seen in FIG. 3, the valve element 29 will have been in its neutral position, but as seen in FIG. 4, the water entering the valve 10 forces the ball 33 against the seat 22a of the outlet 22 to close the outlet port. This isolates all downstream sequence valves from the water supply. However, sprinkler port 23 is open, so that as indicated in FIG. 4, the water flows through the sprinkler port 23 and out the sprinkler head 12. During sprinkling, water is slowly forced through the metering sleeve 34 and hence flows through port 52 in stem 44 and into the expansible control chamber 54. This action continues until the pressure within the control chamber 54 is equal to the water pressure within the valve body chamber 30a. As water enters the control chamber 54, it distends the reservoir diaphragm 31 until the diaphragm reaches the position shown in FIG. 4. At this time, the pressures on opposite sides of skirt 42 and connected parts are balanced, and there is no pressure differential to shift the valve ball. Furthermore, pressure within the interior valve body chamber 30a holds the valve ball against the seat 22a of outlet port 22, which locks the ball in its sprinkling position.

When the sprinkling cycle is to be terminated, the water pressure is momentarily reduced by the controller 8, and the valve ball is released from the seat 22a at outlet port 22. The water within the control chamber 54 of the valve actuator will temporarily be maintained at line pressure by the force of distended diaphragm 31. Since the flow of water from within the control chamber 54 is restricted by the foraminous sleeve 34, the unbalanced pressure caused by and the energy stored in the reservoir diaphragm 31, deforms the skirt 42 and forces the ball 33 into sealing engagement with the seat 23a of sprinkler port 23. Now, when the water pressure in the lines is restored, as seen in FIG. 5, water will flow through the outlet port 22 and will be prevented from flowing out of the sprinkler port 23 by the ball 33. Thus the next downstream sequence valve receives water for a sprinkling cycle at that valve.

As indicated in FIG. 5, some water re-enters the control chamber 54 and stretches diaphragm 31 to its full line position, with which the pressures in the control chamber 54 and the exterior chamber 30a are again equalized. Since the upper portion of the valve ball is isolated from chamber 30a by the sprinkler seat 23a, there now exists an unbalanced pressure on the valve ball, which firmly seats the ball against the seat 23a of the sprinkler port 23.

Each subsequent momentary reduction of pressure will maintain the ball 33 in engagement with the seat at the sprinkler port 23, since very little water escapes from the control chamber 54 during each momentary reduction of pressure, and diaphragm 31 remains in a stretched condition.

When the last valve in each lateral line 9 has completed its sprinkling cycle, water pressure is reduced by controller 8 for a longer period of time. This time is sufficient to permit diaphragm 31 to force water out of control chamber 54, through the orifice 52 and through the metering sleeve 34. The diaphragm 31 and the ball 33 return to the position shown in FIG. 3, ready for initiation of a new irrigation cycle.

The action of the combined metering and filtering sleeve 34 will now be described in more detail. With the valve in its initial position of FIG. 3, and referring especially to FIG. 6 when water under pressure is first applied to the valve, pressure in the control chamber 54 (FIG. 3) will be low, or it may be at atmospheric pressure. When water under pressure reaches the sleeve 34, it flows through the pores or interstices of the entire sleeve, that is, around its entire circumference. As mentioned, the sleeve is porous and is made of sintered bronze. This provides a material for the sleeve 34 that resembles a body of closely packed small spheres, so that the sleeve acts as a flow restrictive filter.

As indicated in FIG. 6, as water is forced through the pores in sleeves 34 around its entire circumference, this water partially collapses the underlying rubber stem 44. An annular passage p, is now established between the sleeve and stem 44, and this passage communicates with port 52 in the stem. Thus the central chamber 54 (FIG. 3) is filled relatively quickly, and the entire surface of sleeve 34 is available as a filter for impurities, as well as for filling the control chamber.

When the water pressure is reduced, as previously described, the water trapped in control chamber 54, is pressurized by diaphragm 31, whereas a low or even atmospheric pressure exists in external chamber 30a. Thus stem 44 is internally expanded against the porous sleeve 34, closing the annular passage p. Now substantially all the water leaving the control chamber must flow through the relatively small area a of the sleeve, and this area acts as a metering orifice. The area a will not become clogged with impurities because the water in the control chamber was filtered as it entered the chamber. In fact, during this phase of operation, the water leaving the control chamber serves to wash foreign matter clear of the area a of the filter sleeve. There may be some slight discharge of water through the sleeve adjacent zone a, but this does not affect the basic mode of operation.

It can be seen that if all of the water that enters the control chamber were required to pass through the small area a of the filter sleeve on each new irrigation cycle, that area could become plugged before the control chamber has been filled, rendering operation of the valve erratic. The port 52 in the stem 44 provides no metering action, it is large enough so that all metering is provided by the filter sleeve 34.

It is apparent from the foregoing description that the sequence irrigation valve of the present invention is simple in design and is inexpensive to manufacture. The valve is operated by timed pressure changes, to control the flow of water therethrough, and the irrigation water can be utilized as a valve controlling agent without plugging by impurities. The valve ball and actuator assembly are readily removed from the body by merely unscrewing the base portion from the main body portion. The combined metering and filtering action of the sleeve prevents clogging of the metering sleeve by impurities in the water flowing through the valve. This is of importance in an irrigation system, wherein the water is often pumped from ditches.

While one embodiment of the present invention has been shown and described, it will be understood that various changes and modification may be made without departing from the spirit of the invention or the scope of the appended claims.

The invention having thus been described, what is believed to be new and desired to be protected by Letters Patent is:

1. A sequence irrigation valve comprising a valve body having an inlet port for connection into a water line, a first outlet port for connection to the same line, and a second outlet port for connection to a water discharge device, a pressure responsive actuator mounted in said valve body, said actuator comprising resilient diaphragm means forming an expansible control chamber, a flexible tubular stem projecting from said diaphragm means, a valve member mounted on said stem to be selectively positioned by the actuator for engagement with either of said outlet ports, a port in said stem, a foraminous sleeve surrounding said stem and overlying said port for establishing a restricted flow passage between the interior of said valve body and the interior of said control chamber, flow of water into said control chamber distending said diaphragm means, reduction in the water pressure in said valve body causing said distended diaphragm means to urge said valve member against said second outlet port, said valve member blocking flow through the associated water discharge device upon resumption of water pressure in said valve body.

2. A sequential irrigation valve comprising a valve body having a water inlet port, a sprinkler outlet port and an outlet port for conducting water to a downstream valve, a valve member in said body arranged to be selectively moved into sealing engagement with said outlet ports, a valve actuator mounted within said body, said actuator comprising flexible diaphragm means forming an expansible control chamber, a resilient tubular stem extending from said diaphragm means and connected to said valve member, a port in said stem, a foraminous sleeve surrounding said tubular stem and overlying the port in the stem, initial introduction of water under pressure into said valve body causing water to flow through the interstices of said foraminous sleeve to partially collapse the underlying tubular stem and open up an annular water passage in communication with said port, the resulting flow of water into said control chamber distending said diaphragm subsequent reduction of water pressure in said body causing said distended diaphragm to move said valve member from said outlet port into sealing engagement with said sprinkler port and to slowly force water from said control chamber through said port and foraminous sleeve, the unbalanced pressure in said control chamber also re-expanding said tubular stem against said foraminous sleeve so that the water leaving said control chamber must flow through that portion of the foraminous sleeve that overlies the port in said tubular stem.

3. A sequential irrigation valve comprising a valve having a water inlet port, a sprinkler outlet port and an outlet port for conducting water to a downstream valve, a valve member in said body arranged to be selectively moved into sealing engagement with said outlet ports, a valve actuator mounted within said body, said actuator comprising a resilient tubular stem connected to said valve member, a port in said stem, a flexible resilient skirt integral with said stem, mounting means for said skirt, and a flexible resilient diaphragm in fluid tight engagement with said skirt mounting means to form a control chamber, a foraminous sleeve surrounding said tubular stem and overlying the port in the stem, initial introduction of water under pressure into said valve body causing water to flow through the interstices of said foraminous sleeve to partially collapse the underlying tubular stem and open up an annular water passage in communication with said port, the resulting flow of water into said control chamber distending said diaphragm, subsequent reduction of water pressure in said body causing said distended diaphragm to move said valve member from said outlet port into sealing engagement with said sprinkler port, and to slowly force water from said control chamber through said port and foraminous sleeve, the unbalanced pressure in said control chamber also re-expanding said tubular stem against said foraminous sleeve so that the water leaving said control chamber must flow through that portion of the foraminous sleeve that overlies the port in said tubular stem.

4. A sequential irrigation valve comprising a valve body having an inlet port and two outlet ports, a valve member in said valve body, and a valve actuator in said valve body; said actuator including means forming an expansible water chamber, means for mounting said actuator in said valve body, a resilient tubular stem projecting from said actuator, means mounting said valve member on said tubular stem for selectively closing said outlet ports, a water transfer port formed in the wall of said tubular stem, and a combined filter and flow restricting element associated with said port, said element comprising a porous sleeve that substantially surrounds said tubular stem and overlies said water transport port in the stem.

5. The irrigation valve of claim 4, wherein said valve member is a ball, and wherein said valve member mounting means detachable mounts said ball on the free end of said tubular stem.

6. A sequential irrigation valve comprising a valve body having an inlet port and two outlet ports, a valve member in said valve body, and a valve actuator in said valve body; said actuator including a resilient tubular stem, a flexible skirt extending from said stem, skirt mounting means, a resilient diaphragm sealed with said skirt mounting means to form a control chamber, a valve ball mounted on said tubular stem for selectively closing said outlet ports, a water transfer port in said tubular stem, and a foraminous sleeve surrounds said stem and overlying the port in the stem.

7. A sequential irrigation valve comprising a composite body having a main portion and a base portion, the main portion of said body having a water inlet port, a sprinkler outlet port and an outlet port for conducting water to a downstream valve, a valve actuator within said composite valve body, said actuator comprising resilient tubular stem, a port in said stem, a flexible resilient skirt integral with said stem, mounting means for said skirt comprising a peripheral flange, a flexible resilient diaphragm overlying said skirt mounting flange, said diaphragm and skirt mounting flange being clamped between said body portions to form a control chamber, a valve ball detachably mounted on said stem, and a foraminous sleeve surrounding said tubular stem and overlying the port in the stem to provide a filtered flow passage between the interior of said body and said control chamber.

References Cited in the file of this patent
UNITED STATES PATENTS

| | | |
|---|---|---|
| 2,921,629 | Stout | Jan. 19, 1960 |
| 2,984,253 | Stout et al. | May 16, 1961 |
| 3,003,514 | Furlong | Oct. 10, 1961 |
| 3,042,074 | Graybill | July 3, 1962 |